(12) United States Patent
Omori

(10) Patent No.: US 11,100,610 B2
(45) Date of Patent: Aug. 24, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hirotaka Omori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 16/275,019

(22) Filed: Feb. 13, 2019

(65) Prior Publication Data

US 2019/0251667 A1    Aug. 15, 2019

(30) Foreign Application Priority Data

Feb. 14, 2018 (JP) .............................. JP2018-024128
Jan. 15, 2019 (JP) .............................. JP2019-004360

(51) Int. Cl.
*G06T 5/00* (2006.01)
*G06T 7/90* (2017.01)
*G06T 5/20* (2006.01)
*G06T 5/50* (2006.01)

(52) U.S. Cl.
CPC ............... *G06T 5/002* (2013.01); *G06T 5/20* (2013.01); *G06T 5/50* (2013.01); *G06T 7/90* (2017.01); *G06T 2207/10024* (2013.01)

(58) Field of Classification Search
CPC ............... H04N 9/045; H04N 9/04557; H04N 9/04561; H04N 9/643; H04N 9/646
See application file for complete search history.

(56) References Cited

U.S. PATENT DOCUMENTS

| | | | | |
|---|---|---|---|---|
| 2006/0227227 | A1* | 10/2006 | Tsuruoka | H04N 9/045 |
| | | | | 348/241 |
| 2007/0242875 | A1 | 10/2007 | Seiji et al. | |
| 2014/0240533 | A1* | 8/2014 | Hirooka | H04N 9/646 |
| | | | | 348/223.1 |

FOREIGN PATENT DOCUMENTS

| | | |
|---|---|---|
| CN | 1466844 A | 1/2004 |
| CN | 102769722 A | 11/2012 |
| CN | 104023218 A | 9/2014 |
| CN | 104123699 A | 10/2014 |
| CN | 104751441 A | 7/2015 |
| EP | 1174824 A2 | 1/2002 |
| JP | 200472422 A | 3/2004 |

(Continued)

OTHER PUBLICATIONS

Kaijun Tang et al; IEEE Transactions on Image Processing, vol. 4, No. 6, pp. 788-798.

(Continued)

*Primary Examiner* — Ross Varndell
(74) *Attorney, Agent, or Firm* — Canon U.S.A., Inc. IP Division

(57) ABSTRACT

There is provided an image processing apparatus for enabling noise reduction in which a color deviation is reduced. The image processing apparatus includes a color value calculation circuit configured to calculate color values from an image signal acquired through imaging, an average value calculation circuit configured to calculate average values of the image signal, and a processing circuit configured to perform noise reduction processing on the image signal, with an intensity according to evaluation values including the color values and the average values.

12 Claims, 14 Drawing Sheets

(56) References Cited

FOREIGN PATENT DOCUMENTS

JP          2010010976 A      1/2010

OTHER PUBLICATIONS

Stefan Schulte et al; IEEE Transactions on Image Processing, vol. 16, No. 5, pp. 1425-1436.
Min Seok Lee; Denoising Algorithm for CFA Image Sensors Considering Inter-Channel Correlation; Sensors, vol. 17, May 28, 2017; No. 6, p. 1236 pp. 1-22.
Won-Jin Lee; Improved Spatiotemporal Noise Reduction for Very Low-Light Environments; IEEE Transactions on Circuits and Systems—II: Express Briefs, vol. 63, No. 9; Sep. 2016, pp. 888-892.

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing technique such as noise reduction.

Description of the Related Art

Conventionally, imaging apparatuses such as digital cameras are known to employ a technique for converting an imaging signal with a small information amount captured under low illumination into an output signal with a large information amount by amplifying the imaging signal through a digital gain. However, when the imaging signal is amplified, the information amount increases and, at the same time, random noise contained in the imaging signal is also amplified. In particular, it is known that a low-luminance portion contains more random noise than a high-luminance portion.

As a method for solving this issue, for example, a method as discussed in Japanese Patent Application Laid-Open No. 2004-72422 is known. Japanese Patent Application Laid-Open No. 2004-72422 discusses a technique for estimating the amount of noise contained in a signal and performing noise reduction processing according to the noise amount estimated. By performing noise reduction processing according to the amount of noise contained in a signal in this way, noise reduction processing can be performed even if a high-luminance portion and a low-luminance portion contain different noise amounts.

However, in the technique for performing noise reduction processing based on the noise amount estimated discussed in Japanese Patent Application Laid-Open No. 2004-72422, deviation to a specific color occurs if a deviation arises in the distributions of the red (R), green (G), and blue (B) signals constituting the image signal. In particular, unnatural hue in a low-luminance portion is emphasized. Therefore, there is considered to be room for improvement in noise reduction processing.

SUMMARY OF THE INVENTION

According to an aspect of the present invention, an image processing apparatus includes at least one processor, and a memory including instructions that, when executed by the processor, cause the at least one processor to calculate color values from an image signal acquired through imaging, calculate average values of the image signal, and perform noise reduction processing on the image signal, with an intensity according to evaluation values including the average values and the color values.

Further features of the present invention will become apparent from the following description of embodiments with reference to the attached drawings.

DESCRIPTION OF THE EMBODIMENTS

Embodiments of the present invention will be described in detail below with reference to the accompanying drawings.

Figure 1:
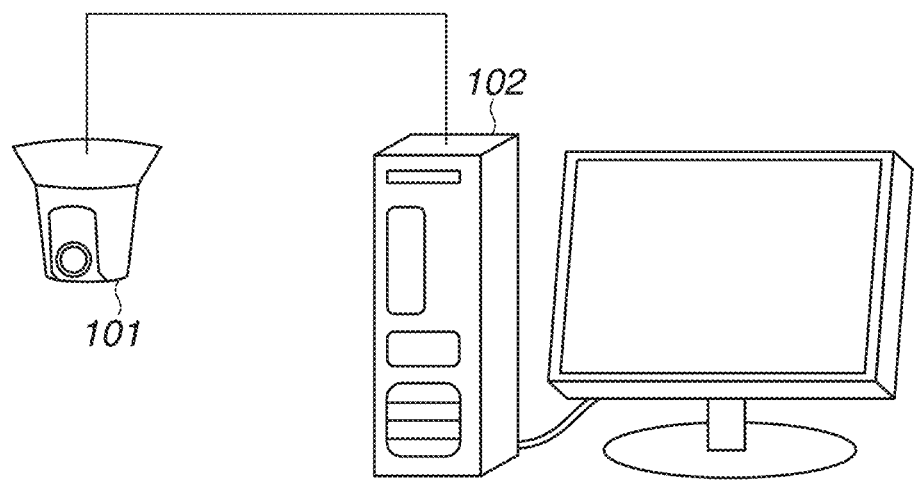
FIG. 1 illustrates an example of an overall configuration of an imaging system.

FIG. 1 illustrates an example of an overall configuration of an imaging system according to the present embodiment. The imaging system illustrated in FIG. 1 includes a monitoring camera 101 as an apparatus for capturing a moving image and performing image processing, and a client apparatus 102 connected with the monitoring camera 101 in a state where the monitoring camera 100 and the client apparatus 102 can communicate with each other via an Internet Protocol (IP) network. Examples where the monitoring camera 101 is provided with functions of an image processing apparatus according to the present embodiment will be described below. The client apparatus 102 may be provided with functions of the image processing apparatus according to the present embodiment. A moving image captured by the monitoring camera 101 is transmitted to the client apparatus 102, displayed thereon, and recorded as required. Although the present embodiment will be described below centering on the monitoring camera 101 as image processing apparatus, the image processing apparatus is not limited thereto. Examples of the client apparatus 102 include various portable terminals (digital cameras, digital camcorders, and smart phones and tablet computers having camera functions), industrial cameras, on-board cameras, and medical cameras.

Figure 2:
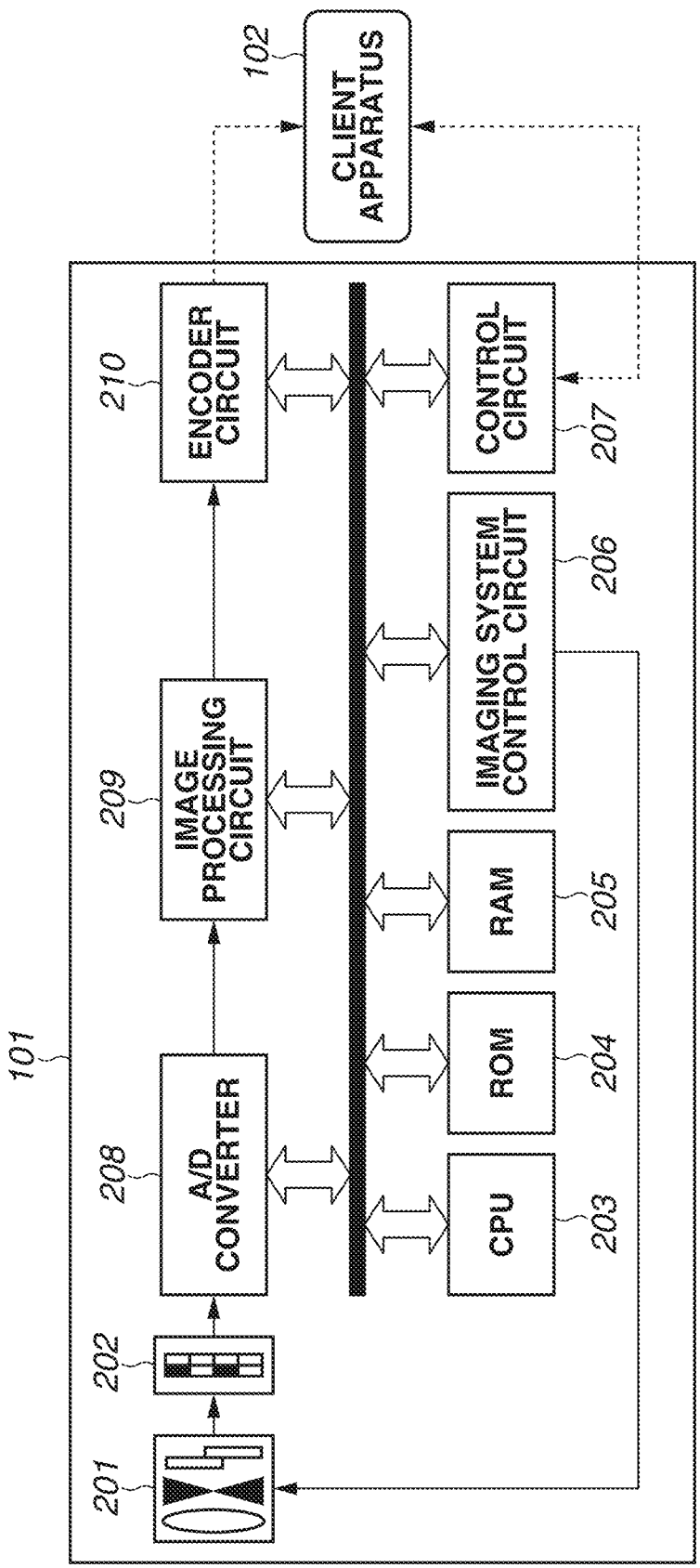
FIG. 2 illustrates an example of an internal configuration of an imaging apparatus.

FIG. 2 is a block diagram illustrating an example of an overall internal configuration of the monitoring camera 101 according to the present embodiment illustrated in FIG. 1.

An imaging optical system 201 including a zoom lens, a focal lens, a camera shake correction lens, a diaphragm, and a shutter forms an optical image of a subject on the imaging plane of an image sensor 202. The image sensor 202 having a color filter corresponding to each pixel is, for example, a charge coupled device (CCD) sensor or complementary metal-oxide semiconductor (CMOS) sensor for converting light incident to the imaging plane into an electrical signal. The image sensor 202 receives light that penetrated the color filter and enters the imaging plane, and converts the light into an electric signal. Here, the image sensor 202 is capable of setting an arbitrary exposure time for all pixels. In the monitoring camera 101 according to the present embodiment, the image sensor 202 captures a moving image and outputs an image signal for each of continuous frames on the time axis of the moving image.

The CPU 203 is a controller for performing processing related to all components of the monitoring camera 101 according to the present embodiment. The CPU 203 sequentially reads instructions of a program stored in a read only memory (ROM) 204 and a random access memory (RAM) 205 and, according to a result of interpretation, performs processing. An imaging system control circuit 206 performs focusing control, shutter open/close control, and diaphragm adjustment for the imaging optical system 201 based on focus control instructions, shutter control instructions, and diaphragm control instructions supplied from the CPU 203. A control circuit 207 controls each unit via the CPU 203 based on instructions from the client apparatus 102. The ROM 204 stores programs to be executed by the CPU 203 and various setting values. A program stored in the ROM 204 is loaded into the RAM 205 which temporarily stores data currently being processed in each component.

An analog-to-digital (A/D) converter 208 converts an analog electrical signal (analog imaging signal) acquired through photoelectric conversion by the image sensor 202 into digital signal values. The digital signal values acquired through A/D conversion by the A/D converter 208 are transmitted to an image processing circuit 209 as an image signal for each frame of a moving image. The image processing circuit 209 is a portion that performs image processing on the image signal. The image processing will be described in detail below. An encoder circuit 210 performs encoding processing for converting an image signal having undergone image processing by the image processing circuit 209 into a predetermined file format such as Joint Photographic Experts Group (JPEG) and H.264. Image data produced after the encoding processing by the encoder circuit 210 is transmitted to the client apparatus 102.

Figure 3:
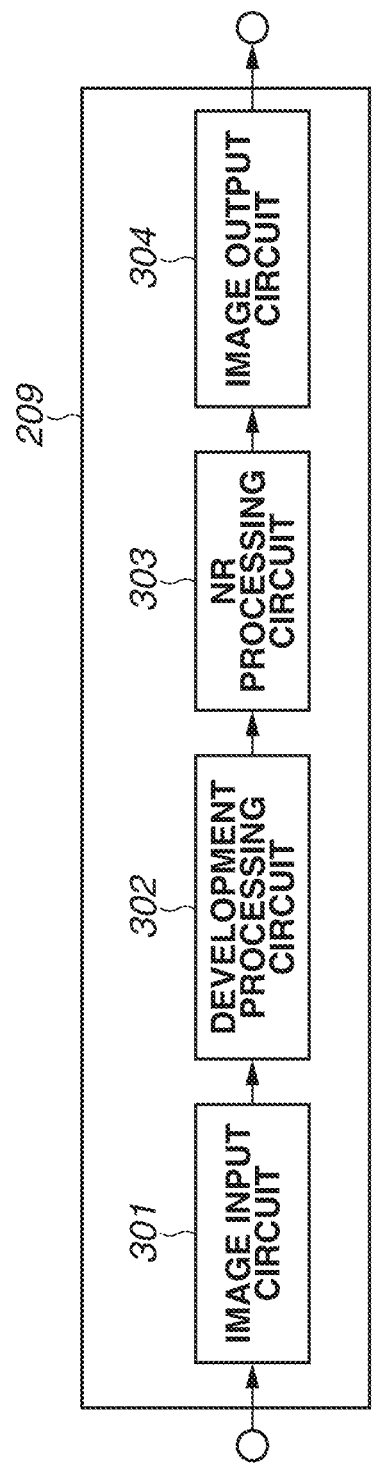
FIG. 3 illustrates an internal configuration of an image processing circuit.

FIG. 3 is a block diagram illustrating an example of an overall internal configuration of the image processing circuit 209 included in the monitoring camera 101 according to the first embodiment.

An image signal of each frame of a moving image captured by the image sensor 202 as described above and having undergone A/D conversion by the A/D converter 208 is input to an image input circuit 301 which serves as a memory. A development processing circuit 302 performs processing such as demosaic processing, white balance adjustment, gamma correction, and sharpness correction on the image signal from the image input circuit 301. A noise reduction (NR) processing circuit 303 performs spatial filter processing or time filter processing on an image processed by the development processing circuit 302 to perform NR processing for reducing random noise which occurs in the spatial and time directions. Detailed configuration and operations of the NR processing circuit 303 according to the present embodiment will be described below. An image output circuit 304, which is a memory for temporarily storing the image signal processed by the NR processing circuit 303, outputs the image signal to the encoder circuit 210 illustrated in FIG. 1. The image input circuit 301 and the image output circuit 304 are not mandatory circuits. The image signal output from the A/D converter 208 may be directly input to the development processing circuit 302, and the image signal output from the NR processing circuit 303 may be directly output to the encoder circuit 210.

Before describing the image processing according to the present embodiment in detail, the principle and issues of general NR processing will be described.

First of all, the principle of the NR processing will be described below.

A known method for general NR processing will be described below. This method compares the pixel value of a target pixel with the pixel values of a plurality of neighborhood reference pixels, obtains the addition average of pixels having high correlations, and outputs the addition average as a pixel value of the target pixel having undergone noise reduction processing. In this case, the NR processing intensity can be controlled by changing the range for referencing reference pixels and changing parameters to be used to calculate the correlations between the target pixel and the reference pixels.

As an example of a method for determining the NR processing intensity, there is a method for determining the NR processing intensity discussed in Japanese Patent Application Laid-Open No. 2004-72422. This method makes it possible to suitably set the NR processing intensity for the high-luminance portion to the low-luminance portion by acquiring factors affecting noise, estimating the noise level on a sensor, and setting the NR processing intensity according to the noise level estimated.

Subsequently, issues of prior art general NR processing known will be described below.

Figure 4:
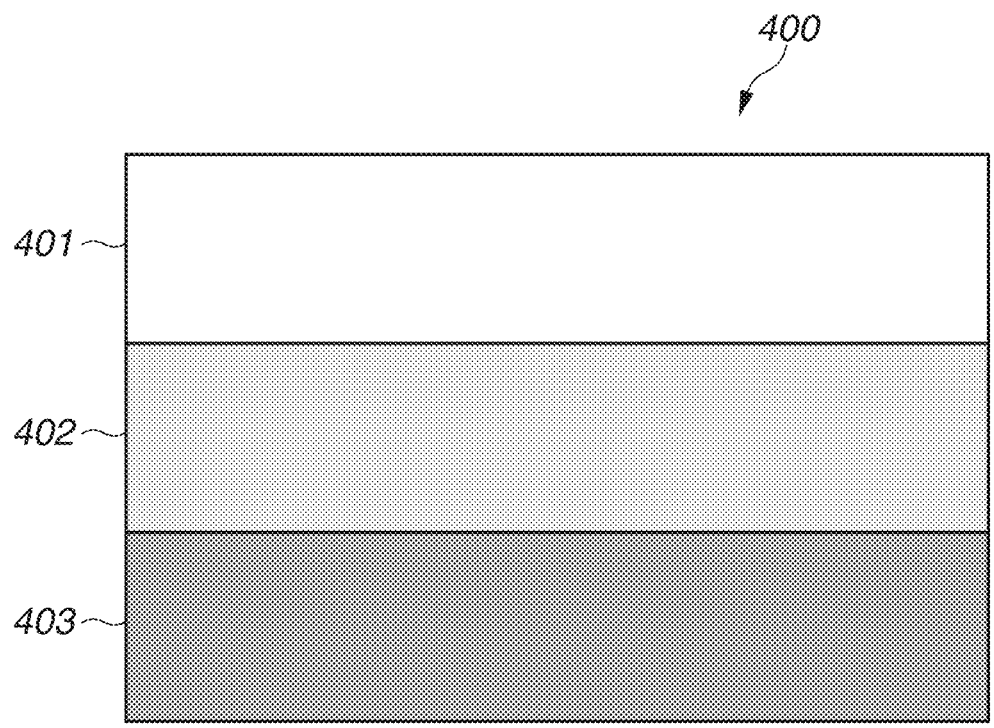
FIG. 4 illustrates an example of a chart for describing a general technical issue.
Figure 5:
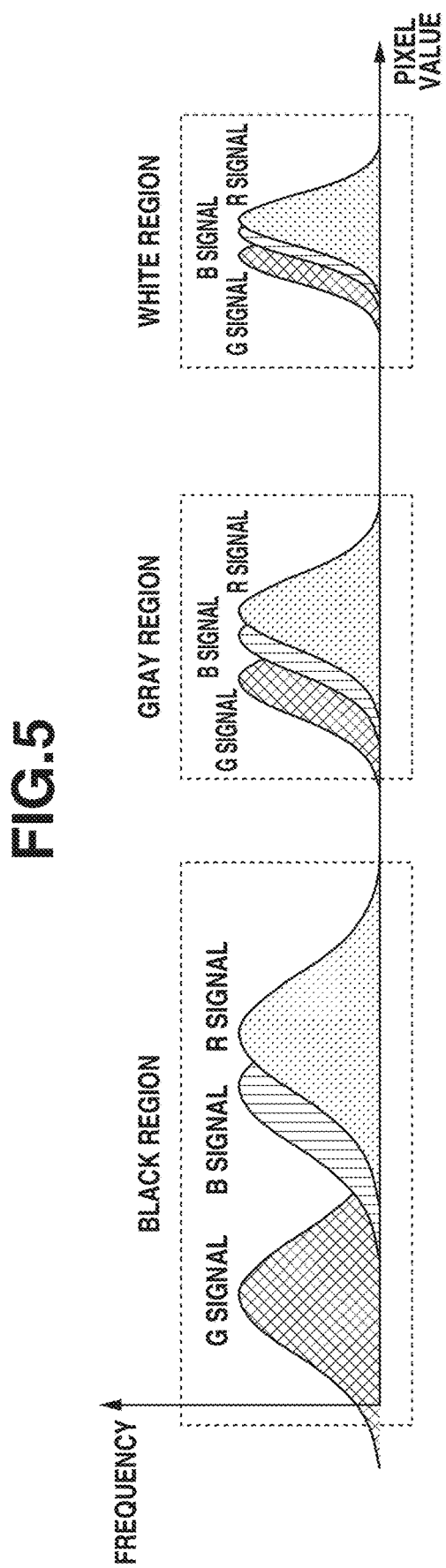
FIG. 5 illustrates a histogram for describing a general technical issue.
Figure 6:
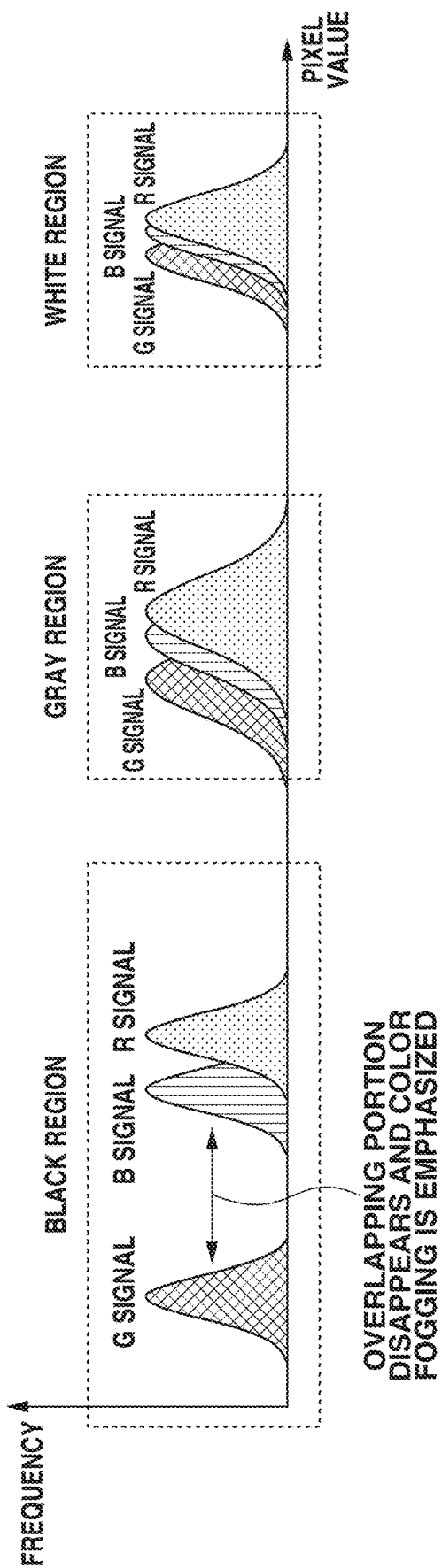
FIG. 6 illustrates another histogram for describing a general technical issue.

In an image with a low signal-to-noise (S/N) ratio captured in a dark environment, such as night, deviation to a specific color from among the three primary colors including the red (R), the green (G), and the blue (B) components may occur. For example, as illustrated in FIG. 4, suppose that a chart 400 in which three different achromatic regions (a white region 401, a gray region 402, and a black region 403 from the top downward) are arranged is captured. When the chart 400 illustrated in FIG. 4 is captured, for example, in a low-illumination environment or a high-temperature environment, random noise largely amplified by the digital gain or dark current noise due to temperature rise causes deviation to a specific color. For example, as illustrated in FIG. 5, if an average value deviation arises between the R, G, and B components (i.e., a deviation in the distribution of each color component), a magenta-like color deviation occurs. Such a color deviation is likely to occur particularly in the low-luminance portion containing much random noise. When an average value deviation arises in the low-luminance portion containing much noise, applying the method for determining the NR processing intensity discussed in Japanese Patent Application Laid-Open No. 2004-72422 sets a high NR processing intensity in a region estimated to contain much random noise as in the low-luminance portion. Therefore, if an overlapping color portion between the R, G, and B components disappears to increase a difference therebetween, as illustrated in FIG. 6, as compared with the image before performing the NR processing illustrated in FIG. 5, a magenta-like color deviation will be emphasized in the image.

According to the present embodiment, as described below, the NR processing intensity is determined based not only on the noise levels obtained from the image signal but also on the average value for each of RGB color components and variation between the colors before and after execution of image processing including the NR processing. Thus, according to the present embodiment, reduced color deviation can be implemented even if a deviation occurs in the distribution of each color component.

Figure 7:
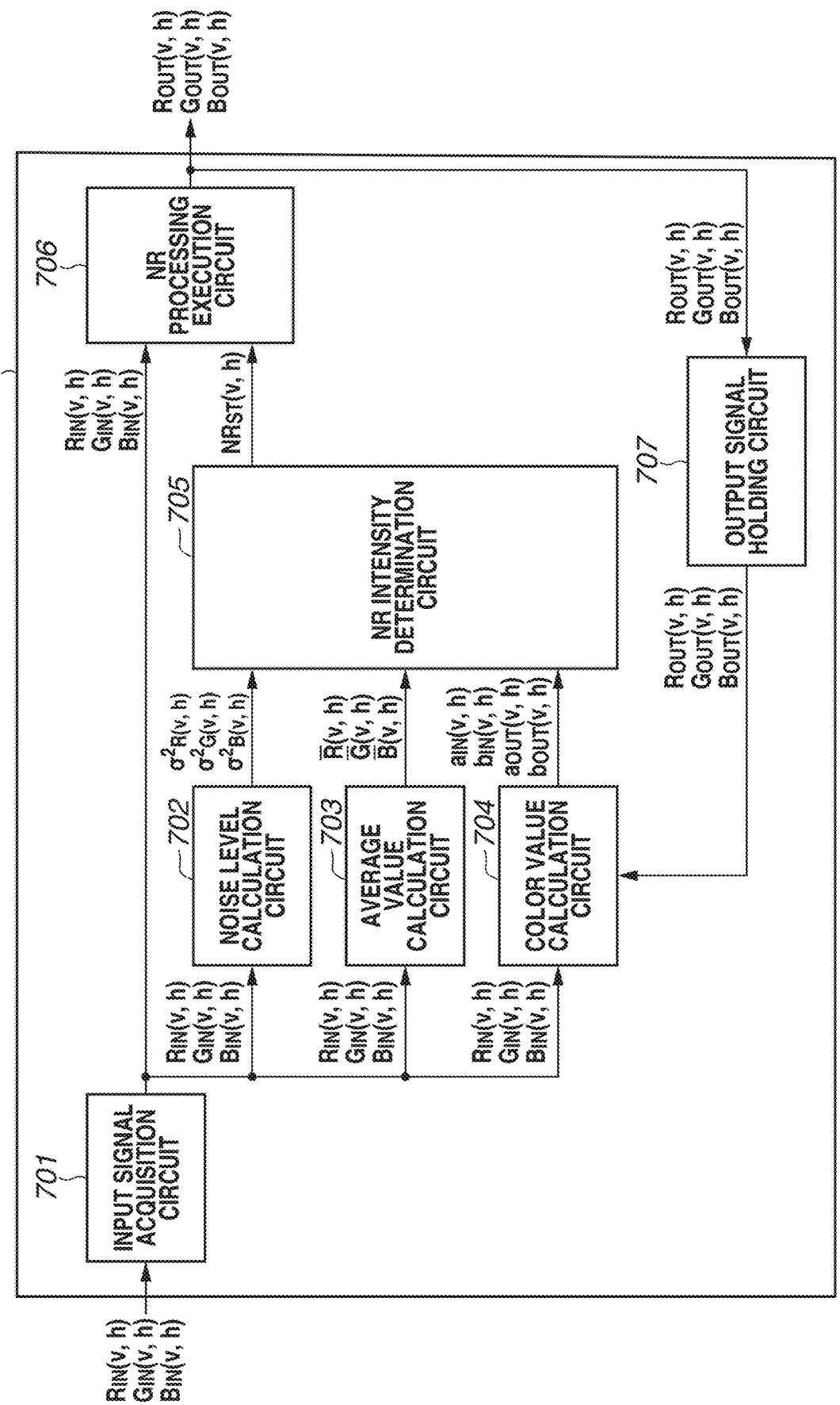
FIG. 7 illustrates an example of an internal configuration of a noise reduction (NR) processing circuit according to a first embodiment.

FIG. 7 is a block diagram illustrating an example of an internal configuration of the NR processing circuit 303 for performing the NR processing on an image signal of a moving image and outputting the processed image signal, according to the present embodiment.

The NR processing circuit 303 according to the present embodiment includes an input signal acquisition circuit 701, a noise level calculation circuit 702, an average value calculation circuit 703, a color value calculation circuit 704, an NR intensity determination circuit 705, an NR processing execution circuit 706, and an output signal holding circuit 707.

The input signal acquisition circuit 701 is a memory that acquires, in each of continuous frames on the time axis configuring a moving image, trichromatic image signals (hereinafter these signals are collectively referred to as an RGB input signal) including the R, G, and B components of a target frame (for example, a frame at a certain time), and temporarily stores the trichromatic image signals.

The noise level calculation circuit 702 performs noise level calculation processing for calculating the noise level (noise amount) for each RGB component based on the RGB input signal. Processing for calculating the noise level for each RGB component will be described in detail below. The noise level calculation circuit 702 outputs a signal representing the noise level calculated for each of the RGB components to the NR intensity determination circuit 705.

The average value calculation circuit 703 performs processing for calculating the average value for each of the RGB components based on the RGB input signal. A method for calculating the average value for each of the RGB components will be described below. The average value calculation circuit 703 outputs a signal representing the average value calculated for each of the RGB components to the NR intensity determination circuit 705.

The color value calculation circuit 704 performs processing for calculating the color value for each signal component based on the RGB input signal and the signal having undergone the NR processing by the NR processing execution circuit 706 (hereinafter referred to as an RGB output signal). Processing for calculating the color values based on the RGB input and RGB output signals will be described in detail below. Then, the color value calculation circuit 704 outputs signals representing the colors of the RGB input and RGB output signals to the NR intensity determination circuit 705.

The NR intensity determination circuit 705 determines an intensity coefficient of the NR processing based on the noise level for each of the RGB components calculated by the noise level calculation circuit 702, the average value for each component calculated by the average value calculation circuit 703, and signals representing the color values calculated by the color value calculation circuit 704. A method for determining the intensity coefficient will be described in detail below. Then, the NR intensity determination circuit 705 outputs a signal representing the intensity coefficient to the NR processing execution circuit 706.

The NR processing execution circuit 706 performs the NR processing on the RGB input signal acquired by the input signal acquisition circuit 701 based on the NR processing intensity determined by the NR intensity determination circuit 705. The RGB output signal having undergone the NR processing is transmitted to the output signal holding circuit 707 and the image output circuit 304 illustrated in FIG. 3.

The output signal holding circuit 707 holds the RGB output signal having undergone the NR processing by the NR processing execution circuit 706. The RGB output signal held by the output signal holding circuit 707 is input as the RGB output signal having undergone the NR processing when the colors are calculated by the color value calculation circuit 704.

Finally, the RGB output signal output from the NR processing execution circuit 706 is transmitted to the image output circuit 304 illustrated in FIG. 3 as an image signal of the current frame having undergone the NR processing by the NR processing execution circuit 706.

Figure 8:
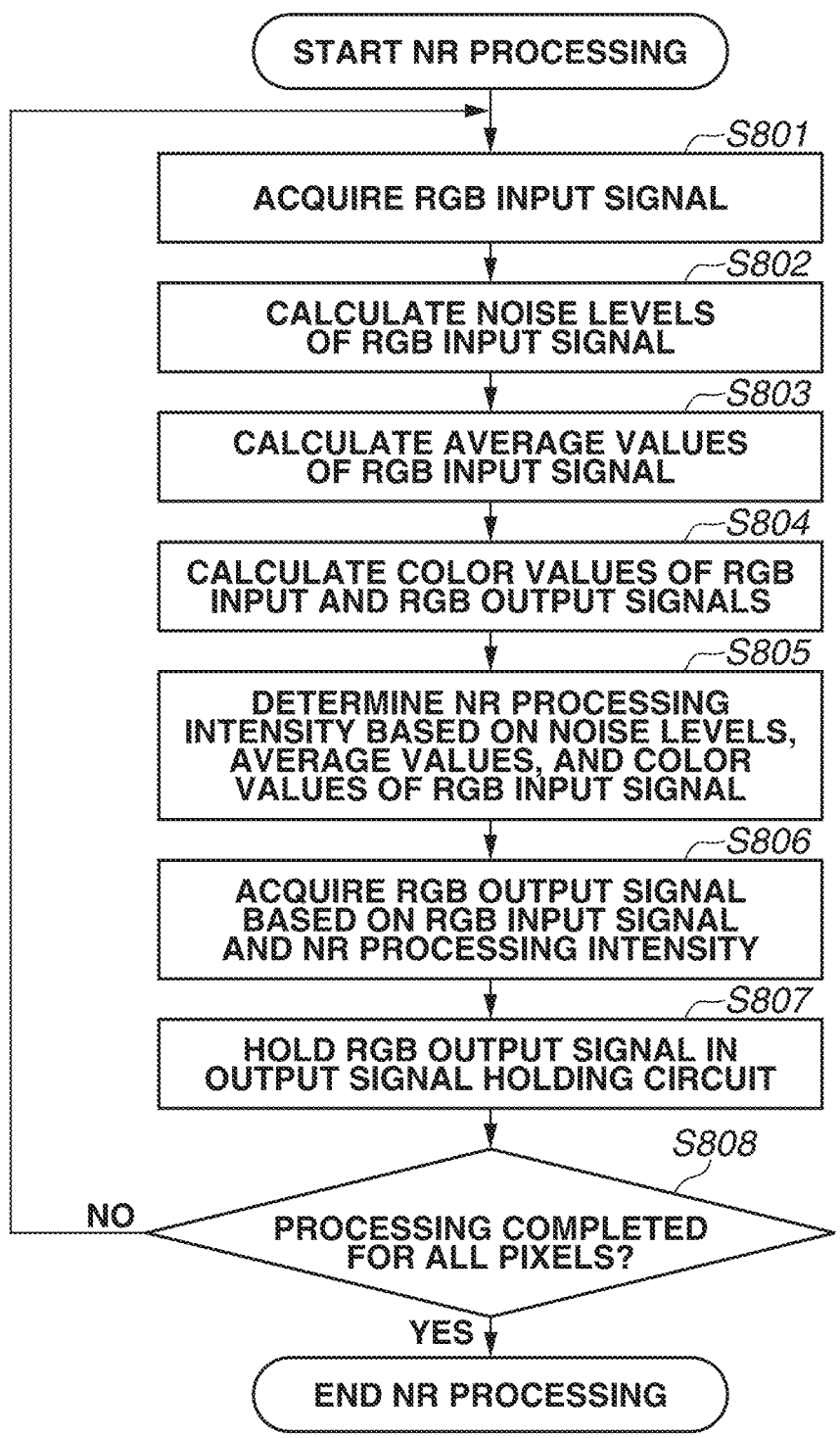
FIG. 8 is a flowchart illustrating NR processing according to the first embodiment.

FIG. 8 is a flowchart illustrating the flow of processing performed by each block of the NR processing circuit 303 illustrated in FIG. 7. The configuration illustrated in FIG. 7 and the processing of the flowchart illustrated in FIG. 8 may be implemented by a hardware configuration, or a part of the processing may be implemented by a software configuration and the remaining processing may be implemented by a hardware configuration. When processing is performed by a software configuration, the processing of the flowchart illustrated in FIG. 8 is implemented, for example, when the CPU 203 executes a program stored in the ROM 204. This also applies to other flowcharts (described below).

In step S801 illustrated FIG. 8, the input signal acquisition circuit 701 acquires the above-described RGB input signal. In the following descriptions, the R, G, and B components of the RGB input signal are denoted by $R_{IN}(v, h)$, $G_{IN}(v, h)$, and $B_{IN}(v, h)$, respectively. (v, h) denotes a two-dimensional coordinate position with the value in the horizontal direction (x-axis direction) and the value in the vertical direction (y-axis direction) in an image. Although, in the present embodiment, processing for the RGB input signal will be described, input signal data to be processed by the NR processing circuit 303 is not particularly limited and can be arbitrarily converted by the input signal acquisition circuit 701. For example, the NR processing (described below) may be performed on the YUV signal, the L*a*b* component, and the visible and invisible components.

In step S802, the noise level calculation circuit 702 calculates the noise level (noise amount) for each of the RGB components $R_{IN}(v, h)$, $G_{IN}(v, h)$, and $B_{IN}(v, h)$ of the RGB input signal. For example, the noise level calculation circuit 702 calculates the dispersion of noise by using formulas (1) and (2) as evaluation values representing the noise levels contained in an image.

$$\sigma^2_{R(v,h)} = \frac{1}{(2 \times s1 + 1)(2 \times s2 + 1)} \sum_{i=-s1}^{s1} \sum_{j=-s2}^{s2} (R(v+i, h+j) - \overline{R}(v, h))^2 \quad \text{[Formula (1)]}$$

$$\overline{R}(v, h) = \frac{1}{(2 \times s1 + 1)(2 \times s2 + 1)} \sum_{i=-s1}^{s1} \sum_{j=-s2}^{s2} R(v+i, h+j) \quad \text{[Formula (2)]}$$

Formulas (1) and (2) obtain a noise dispersion $\sigma^2_{R(v, h)}$ for the R component. Although descriptions of formulas will be omitted, the noise level calculation circuit 702 also calculates noise dispersions $\sigma^2_{G(v, h)}$ and $\sigma^2_{B(v, h)}$ of the G and B components by replacing the R component with the G and B components, respectively, in formulas (1) and (2). The noise dispersion contained in the signal can be correctly calculated by setting large values of s1 and s2 in formulas (1) and (2).

The evaluation value of the noise level is not limited to the dispersion by calculation formulas (1) and (2). For example, various evaluation values such as the standard deviation of noise and the noise characteristics of an image sensor are usable. The evaluation value of the noise level may be based on a combination of at least two of the dispersion, the standard deviation, and the noise characteristics of an image sensor.

In step S803, based on the RGB input signal, the average value calculation circuit 703 performs processing for calculating the average value for each of the RGB components as an evaluation value. For example, the average value calculation circuit 703 calculates the average value of the R component by using formula (2). Although descriptions of formulas will be omitted, the average value calculation circuit 703 also calculates the average value of the G and B components by replacing the R component with the G and B components, respectively, in formula (2).

In step S804, the color value calculation circuit 704 calculates the color values as evaluation values indicating the color in each signal component based on the RGB input signal and the RGB output signal read from the output signal holding circuit 707 in which the signal having undergone the NR processing (described below) is held. The RGB output signal read from the output signal holding circuit 707 is the signal having undergone the NR processing in a frame preceding the frame subjected to the NR processing and desirably is the signal having undergone the NR processing in the frame immediately before the frame being subjected to the NR processing. Although descriptions of formulas will be omitted, the color value calculation circuit 704 calculates the color values of the RGB input signal as $a^*_{IN(v, h)}$ and $b^*_{IN(v, h)}$ and calculates the color values of the RGB output signal as $a^*_{OUT(v, h)}$ and $b^*_{OUT(v, h)}$. Evaluation values representing the color are not limited to the values of a* and b* in the Lab space. For example, the UV components at the time of YUV conversion, the x and y values in the XYZ color system, and the H (Hue) and S (Saturation) values in the HSV color space are also usable.

In step S805, the NR intensity determination circuit 705 determines the NR processing intensity based on the evaluation values respectively acquired as described above. More specifically, the NR intensity determination circuit 705 determines the NR processing intensity based on the noise level for each of the RGB components from the noise level calculation circuit 702, the average value for each of the RGB components from the average value calculation circuit 703, and the color values from the color value calculation circuit 704.

Figure 9:
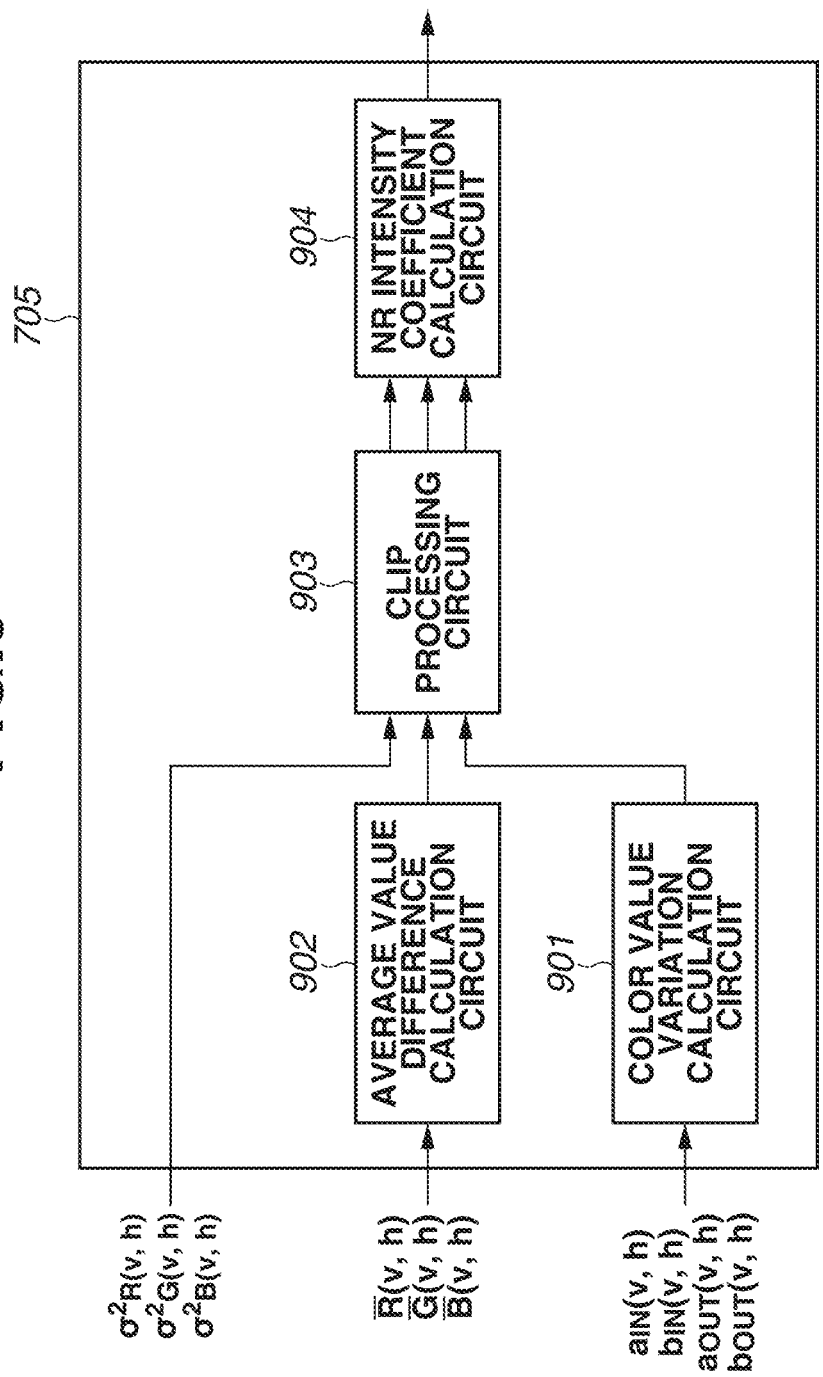
FIG. 9 illustrates an example of an internal configuration of an NR intensity determination circuit according to the first embodiment.

FIG. 9 is a block diagram illustrating an example of a configuration of the NR intensity determination circuit 705.

As illustrated in FIG. 9, the NR intensity determination circuit 705 includes a color value variation calculation circuit 901, an average value difference calculation circuit 902, a clip processing circuit 903, and an NR intensity coefficient calculation circuit 904.

The color value variation calculation circuit 901 calculates color value variation based on the color values calculated by the color value calculation circuit 704. Processing for calculating color value variation will be described in detail below. Then, the color value variation calculation circuit 901 outputs a signal representing color value variation to the clip processing circuit 903.

The average value difference calculation circuit 902 calculates the difference between the average values (hereinafter referred to as an average value difference) by using the average values of the RGB input signal calculated by the average value calculation circuit 703 illustrated in FIG. 7. Processing for calculating the average value difference will be described in detail below. Then, the average value difference calculation circuit 902 outputs a signal representing the average value difference to the clip processing circuit 903.

The clip processing circuit 903 performs clip processing on the noise dispersion of the RGB input signal input from the noise level calculation circuit 702, color value variation input from the color value variation calculation circuit 901, and the average value difference input from the average value difference calculation circuit 902. The clip processing will be described in detail below. The clip processing circuit 903 outputs signals having undergone the clip processing to the NR intensity coefficient calculation circuit 904.

The NR intensity coefficient calculation circuit 904 calculates the intensity coefficient of the NR processing performed by the NR processing execution circuit 706 based on the signal having undergone the clip processing by the clip processing circuit 903. Processing for calculating the NR intensity coefficient will be described in detail below. The NR processing intensity coefficient calculated by the NR intensity coefficient calculation circuit 904 is output to the NR processing execution circuit 706 illustrated in FIG. 7.

Figure 10:
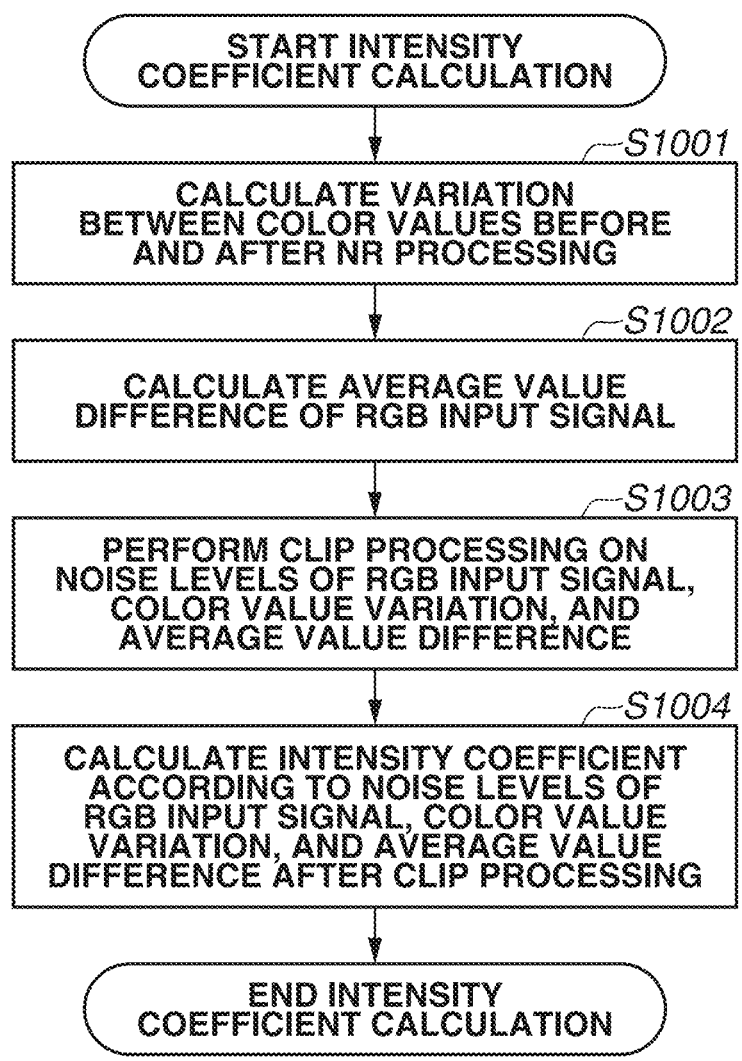
FIG. 10 is a flowchart illustrating NR intensity determination processing according to the first embodiment.

FIG. 10 is a flowchart illustrating the flow of processing performed by each block of the NR intensity determination circuit 705 illustrated in FIG. 9.

In step S1001 illustrated in FIG. 10, the color value variation calculation circuit 901 calculates variations between color values $a^*_{IN(v, h)}$ and $b^*_{IN(v, h)}$ of the RGB input signal input from the color value calculation circuit 704 and color values $a^*_{OUT(v, h)}$ and $b^*_{OUT(v, h)}$ of the RGB output signal, respectively. More specifically, the color value variation calculation circuit 901 calculates variation between the color values before and after execution of the NR processing. For example, the color value variation calculation circuit 901 calculates variation $\Delta a^*b^*(v, h)$ between the color values before and after execution of the NR processing by using formula (3). Then, the color value variation $\Delta a^*b^*(v, h)$ calculated by the color value variation calculation circuit 901 is transmitted to the clip processing circuit 903. If there has been a change in a subject between the frame subjected to the NR processing and the frame read from the output signal holding circuit 707, color value variation increases regardless of the result of the NR processing. Accordingly, a configuration may be added such that a motion vector for each region between frames is calculated, and, in a region where the motion vector is large and estimated that there is a high possibility of a change in the subject, the color value variation $\Delta a^*b^*(v, h)$ is fixed at 0 or at a default value.

$$\Delta a^*b^*(v, h) = \sqrt{(a^*_{IN(v,h)} - a^*_{out(v,h)})^2 + (b^*_{IN(v,h)} - b^*_{out(v,h)})^2} \quad \text{[Formula (3)]}$$

In step S1002, the average value difference calculation circuit 902 calculates an average value difference $\Delta Ave(v, h)$ by using the average values of the RGB input signal input from the average value calculation circuit 703. For example, the average value difference calculation circuit 902 calculates the average value difference $\Delta Ave(v, h)$ by using formula (4). The average value difference ΔAve(v, h) calculated by the average value difference calculation circuit 902 is transmitted to the clip processing circuit 903.
[Formula (4)]

$$\Delta Ave(v,h) = |\overline{R}(v,h) - \overline{G}(v,h)| + |\overline{G}(v,h) - \overline{B}(v,h)| + |\overline{B}(v,h) - \overline{R}(v,h)|$$ [Formula 4]

In step S1003, the clip processing circuit 903 performs the clip processing on the noise levels (noise dispersions $\sigma^2_{R(v,h)}$, $\sigma^2_{G(v,h)}$, $\sigma^2_{B(v,h)}$) of the RGB input signal, the color value variation $\Delta a^*b^*(v, h)$, and the average value difference $\Delta Ave(v, h)$. For example, the clip processing circuit 903 performs the clip processing on each signal component by using formulas (5), (6), and (7).

$$\hat{\sigma}^2_{R(v,h)} = \begin{cases} \sigma^2_{MIN} & \text{if } \sigma^2_{R(v,h)} < \sigma^2_{MIN} \\ \sigma^2_{R(v,h)} & \text{if } \sigma^2_{MIN} \leq \sigma^2_{R(v,h)} \leq \sigma^2_{MAX} \\ \sigma^2_{MAX} & \text{if } \sigma^2_{MAX} < \sigma^2_{R(v,h)} \end{cases}$$ [Formula (5)]

$$\Delta \hat{a}^* \hat{b}^* (v, h) = \begin{cases} \Delta a^* b^*_{MIN} & \text{if } \Delta a^* b^*(v, h) < \Delta a^* b^*_{MIN} \\ \Delta a^* b^*(v, h) & \text{if } \Delta a^* b^*_{MIN} \leq \Delta a^* b^*(v, h) \leq \Delta a^* b^*_{MAX} \\ \Delta a^* b^*_{MAX} & \text{if } \Delta a^* b^*_{MAX} < \Delta a^* b^*(v, h) \end{cases}$$ [Formula (6)]

$$\Delta Ave(v, h) = \begin{cases} \Delta Ave_{MIN} & \text{if } \Delta Ave(v, h) < \Delta Ave_{MIN} \\ \Delta Ave(v, h) & \text{if } \Delta Ave_{MIN} \leq \Delta Ave(v, h) \leq \Delta Ave_{MAX} \\ \Delta Ave_{MAX} & \text{if } \Delta Ave_{MAX} < \Delta Ave(v, h) \end{cases}$$ [Formula (7)]

Formula (5) represents the clip processing on the noise dispersion $\sigma^2_{R(v, h)}$ for the R component. Referring to formula (5), $\sigma^2_{MAX}$ is a parameter for defining the upper-limit value of the noise dispersion $\sigma^2_{R(v, h)}$ of the R component, and $\sigma_{MIN}$ is a parameter for defining the lower-limit value of the noise dispersion $\sigma^2_{R(v, h)}$ of the R component. Although descriptions of formulas are omitted, the clip processing circuit 903 also performs the clip processing on the noise dispersions $\sigma^2_{G(v, h)}$ and $\sigma^2_{B(v, h)}$ of the G and B components by replacing the R component with the G and B components, respectively, in formula (5).

Formula (6) represents the clip processing on the color value variation $\Delta a^*b^*(v, h)$. Referring to formula (6), $\Delta a^*b^*(v, h)_{MAX}$ is a parameter for defining the upper-limit value of the color value variation $\Delta a^*b^*(v, h)$, and $\Delta a^*b^*(v, h)_{MIN}$ is a parameter for defining the lower-limit value of the color value variation $\Delta a^*b^*(v, h)$.

Formula (7) represents the clip processing on the average value difference $\Delta Ave(v, h)$. Referring to formula (7), $\Delta Ave_{MAX}$ is a parameter for defining the upper-limit value of the average value difference $\Delta Ave(v, h)$, and $\Delta Ave_{MIN}$ is a parameter for defining the lower-limit value of the average value difference $\Delta Ave(v, h)$.

In step S1004, the NR intensity coefficient calculation circuit 904 calculates an NR processing intensity coefficient NRST based on the noise dispersions, the color value variation, and the average value difference after the clip processing. For example, the NR intensity coefficient calculation circuit 904 calculates the NR processing intensity coefficient NRST by calculating the ratio, as illustrated in formula (8), by using the noise dispersions $\sigma^2_{R(v, h)}$, $\sigma^2_{G(v, h)}$, and $\sigma^2_{B(v, h)}$, the color value variation $\Delta a^*b^*(v, h)$, and the average value difference $\Delta Ave(v, h)$.

$$NR_{ST}(v, h) = NR_{MAX} \times \left( \alpha \times \frac{\hat{\sigma}^2_R(v, h) - \sigma^2_{MIN}}{\sigma^2_{MAX} - \sigma^2_{MIN}} \right) \times$$ [Formula (8)]

$$\left( \beta \times \frac{\Delta a^* b^*_{MAX} - \Delta \hat{a}^* \hat{b}^*(v, h)}{\Delta a^* b^*_{MAX} - \Delta a^* b^*_{MIN}} \right) \times$$

$$\left( \gamma \times \frac{\Delta Ave(v, h) - \Delta Ave_{MIN}}{\Delta Ave_{MAX} - \Delta Ave_{MIN}} \right)$$

Formula (8) calculates the NR processing intensity coefficient NRST for the R component. Although descriptions of formulas are omitted, the NR intensity coefficient calculation circuit 904 also calculates the NR processing intensity coefficient for the G and B components by replacing the R component with the G and B components, respectively, in formula (8). $NR_{MAX}$ in formula (8) is a parameter for defining the range between the upper- and the lower-limit values of the NR intensity $NR_{ST}(v, h)$. Referring to formula (8), $\alpha$ denotes a parameter for controlling influences of the noise dispersions on the NR intensity coefficient, $\beta$ denotes a parameter for controlling influences of the color value variation on the NR intensity coefficient, and $\gamma$ denotes a parameter for controlling influences of the average value difference on the NR intensity coefficient. The parameters $\alpha$, $\beta$, and $\gamma$ control influences of the noise dispersions, the color value variation, and the average value difference on the NR intensity coefficient. Although, in the present embodiment, $NR_{MAX}$ is defined in a range from 0 to 128, the range of $NR_{MAX}$ is not limited thereto. $\sigma^2_{MAX}$, $\sigma^2_{MIN}$, $\Delta a^*b^*(v, h)_{MAX}$, $\Delta a^*b^*(v, h)_{MIN}$, $\Delta Ave_{MAX}$, and $\Delta Ave_{MIN}$ are similar parameters to the parameters used in formulas (5), (6), and (7).

A smaller value of the average value difference indicates a region more likely to be an achromatic color region, and a larger value thereof indicates a region more likely to be a chromatic color region. More specifically, the NR intensity $NR_{ST}(v, h)$ defined by formula (8) is a value calculated in consideration of not only the noise amount but also the average value difference for each of the RGB components. Therefore, when the NR processing using the NR intensity $NR_{ST}(v, h)$ is performed, the NR processing intensity is controlled for an achromatic region where a color deviation is noticeable, making it possible to reduce the color deviation. In addition, according to the present embodiment, the NR intensity $NR_{ST}(v, h)$ is calculated in consideration of variation between the color values before and after execution of the NR processing. Therefore, when the NR processing using the NR intensity $NR_{ST}(v, h)$ is performed, it is possible to reduce a color deviation illustrated in FIG. 6 caused by the NR processing from being emphasized, including the chromatic color region.

The above-described parameters including the upper- and lower-limit values, $\alpha$, $\beta$, $\gamma$, and the NR intensity range are not limited to predetermined fixed values. These parameters may be changed by various factors, for example, changed according to the noise amount, dynamically changed by the user, changed depending on the sensor temperature, changed according to luminance variation over the entire image, or changed in consideration of aging of the sensor. For example, the temperature of the image sensor may be detected, and parameters may be changed based on the temperature variation. For example, when changing the parameters based on temperature variation, the parameters are set to large values at high temperature and are set to small values at low temperature. The parameters may also be changed depending on the luminance distribution in the entire image. For example, when the luminance distribution largely deviates toward the low-luminance side, the entire image may possibly become purplish. Therefore, the parameters are set to large values when the luminance distribution largely deviates toward the low-luminance side and are set to small values when the luminance distribution largely deviates toward the high-luminance side. Weights for the parameters α, β, and γ may be changed depending on the characteristics of the image sensor and noise dispersions in the optical black (OB) region. If the characteristics of an imaging sensor is such that the G component tends to be small, for example, the values of the parameters β and γ are weighted to be relatively larger than the value of the parameter α. For example, when the dynamic range of a camera is set to a Wide Dynamic Range (WDR), the parameters may be set to large values. In the WDR setting, since a scene having a larger difference between bright and dark portions may possibly cause a more noticeable color blur, the parameters are set to large values to apply a more intense NR processing. When capturing a night view, the parameters related to the present embodiment may be set to 0 so that the conventional NR processing can be performed. In addition, a region setting corresponding to the sky as a subject may be enabled, and bluish colors in bluish regions in fine weather and reddish colors in reddish regions at the twilight may be maintained. In this case, weights for the parameters α, β, and γ may be changed according to the imaging time zone, for example, through learning processing.

Referring back to the flowchart illustrated in FIG. 8, in step S806, the NR processing execution circuit 706 performs the NR processing on the RGB input signal from the input signal acquisition circuit 701 based on the NR processing intensity determined by the NR intensity determination circuit 705 as described above. For example, if the NR processing implemented in the NR processing execution circuit 706 is NR processing with an upsilon filter, the NR processing execution circuit 706 performs the NR processing expressed by the calculations of formulas (9) and (10).

$$R_{OUT}(v, h) = R_{IN}(v, h) + \sum_{i=-s1}^{s1} \sum_{j=-s2}^{s2} a_{s1s2} \cdot F(R_{IN}(v, h) - R(v+i, h+j)) \quad \text{[Formula (9)]}$$

$$F(x) = \begin{cases} (x(v, h) - x(v+i, h+j) & if\, |x(v, h) - x(v+i, h+j)| \le \varepsilon \\ 0 & \text{otherwise} \end{cases} \quad \text{[Formula (10)]}$$

If the NR intensity coefficient having a large value is input, the values of s1 and s2 in formula (9) are increased or the setting of a threshold value ε in formula (10) is increased to enhance the effect of the NR processing. Although descriptions of formulas are omitted, the NR processing execution circuit 706 also performs the NR processing for the G and B components by replacing the R component with the G and B components, respectively, in formula (9). An example of an implementation of the NR processing is not limited to the implementation by calculation formulas (9) and (10). For example, a bilateral space NR filter, an NR filter referencing edge information, filter processing for removing isolated points, and a cyclic NR processing filter for reducing random noise in the time direction may be used for the NR processing execution circuit 706. In addition, at least two pieces of processing of these filters may be used.

In step S807, the output signal holding circuit 707 holds the RGB output signal having undergone the NR processing by the NR processing execution circuit 706.

In step S808, the NR processing circuit 303 determines whether the processing in steps S801 to 807 is complete for all pixels of the current frame input. Then, when the NR processing circuit 303 determines that there is an unprocessed pixel (NO in step S808), the processing of the NR processing circuit 303 returns to step S801. Then, the NR processing circuit 303 performs the processing in steps S801 to 807 for the unprocessed pixel. On the other hand, when the NR processing circuit 303 determines that the processing in steps S801 to 807 is complete for all pixels of the current frame input (YES in step S808), the processing exits the flowchart illustrated in FIG. 8 for the frame. Then, the NR processing circuit 303 starts the processing of the flowchart illustrated in FIG. 8 for the next input frame.

As described above, according to the present embodiment, the NR processing intensity is determined, before performing the NR processing, based not only on the noise levels obtained from the RGB input signal but also on the average value for each of the RGB components and variation between the colors before and after execution of the NR processing. Accordingly, the present embodiment makes it possible to suitably reduce noise while reducing a color deviation occurring in the low-luminance portion or at temperature rise. More specifically, the present embodiment enables a monitoring camera, for example, to effectively reduce a color deviation due to illuminance variation, temperature variation, and other imaging environmental variations and at the same perform noise reduction processing with high color reproducibility. Further, the image processing according to the present embodiment makes it possible to reduce not only a color deviation due to illuminance variation, temperature variation, and other imaging environmental variations but also a color deviation due to aging of each component in a monitoring camera and other various factors, thus achieving suitable noise reduction.

According to the present embodiment, the color value calculation circuit 704 calculates the color values of the image signal in the frame subjected to the NR processing and the color values of the image signal in the preceding frame after execution of the NR processing, and transmits the color values to the NR intensity determination circuit 705. However, the processing is not limited thereto. The color value calculation circuit 704 may be configured to calculate the color values of the image signal in the same frame before and after execution of the NR processing, and the color value variation calculation circuit 901 of the NR intensity determination circuit 705 may be configured to calculate variation between these color values.

Figure 11:
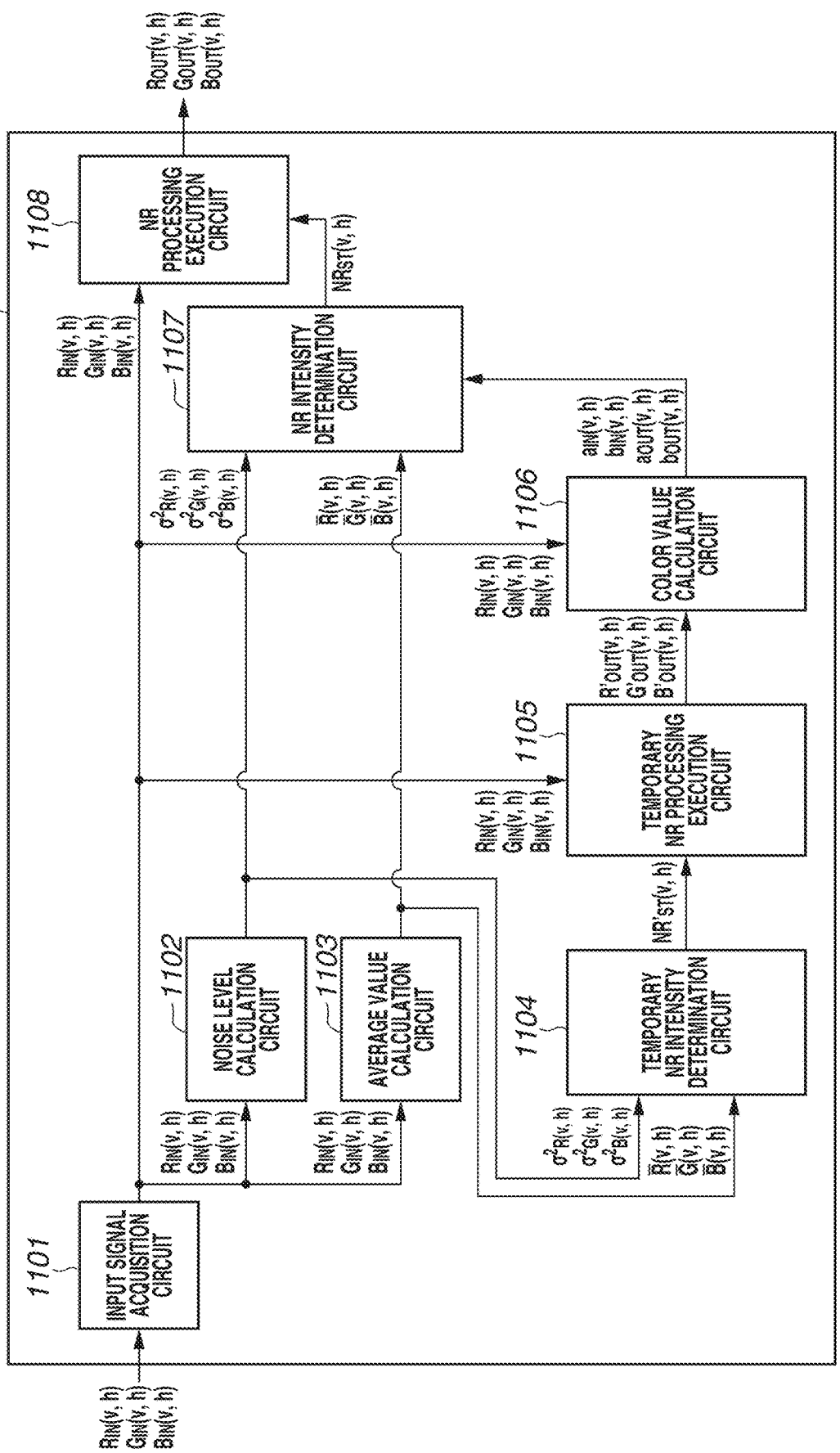
FIG. 11 illustrates another example of an internal configuration of the NR processing circuit according to the first embodiment.

More specifically, as illustrated in FIG. 11, the NR processing circuit 303 includes an input signal acquisition circuit 1101, a noise level calculation circuit 1102, an average value calculation circuit 1103, a color value calculation circuit 1106, an NR intensity determination circuit 1107, and an NR processing execution circuit 1108. The NR processing circuit 303 further includes a temporary NR intensity determination circuit 1104 and a temporary NR processing execution circuit 1105. The temporary NR intensity determination circuit 1104 determines a temporary NR processing intensity coefficient NR'ST based on the noise levels calculated by the noise level calculation circuit 1102 and the average values of the components calculated by the average value calculation circuit 1103. More specifically, the temporary NR intensity determination circuit 1104 determines the temporary NR processing intensity coefficient NR'ST from formula (8) by excluding the term related to color value variation. The temporary NR processing execution circuit 1105 performs the NR processing based on the temporary NR processing intensity and outputs the image signal having undergone the NR processing to the color value calculation circuit 1106. Then, the color value calculation circuit 1106 calculates the color values of the image signal after execution of the NR processing calculated by the temporary NR processing circuit 1105 and the color values of the image signal in the same frame before execution of the NR processing. Then, the color value calculation circuit 1106 performs similar processing to step S805 and subsequent steps illustrated in FIG. 8.

Figure 12:
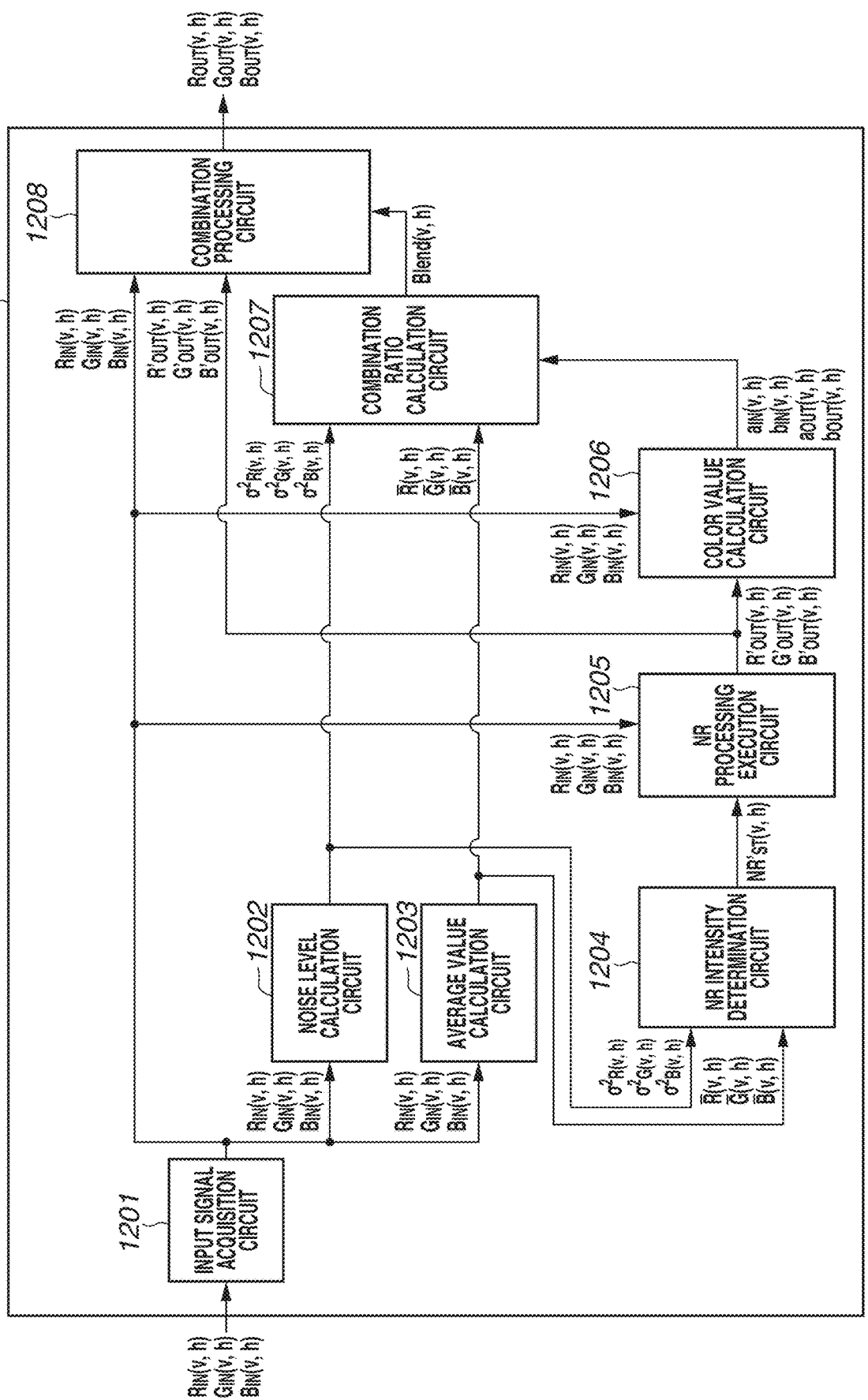
FIG. 12 illustrates yet another example of an internal configuration of the NR processing circuit according to the first embodiment.
Figure 13:
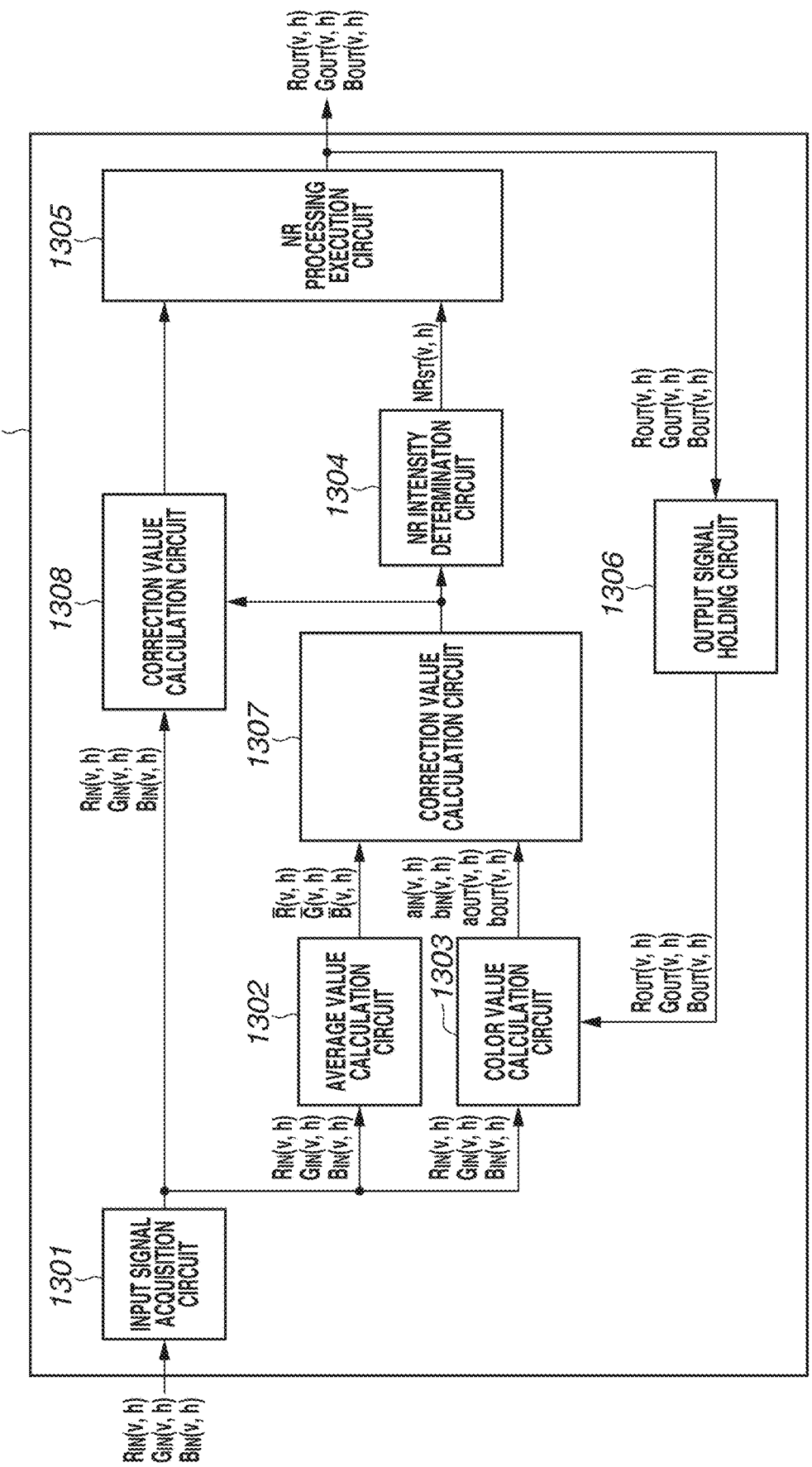
FIG. 13 illustrates an example of an internal configuration of an NR processing circuit according to a second embodiment.
Figure 14:
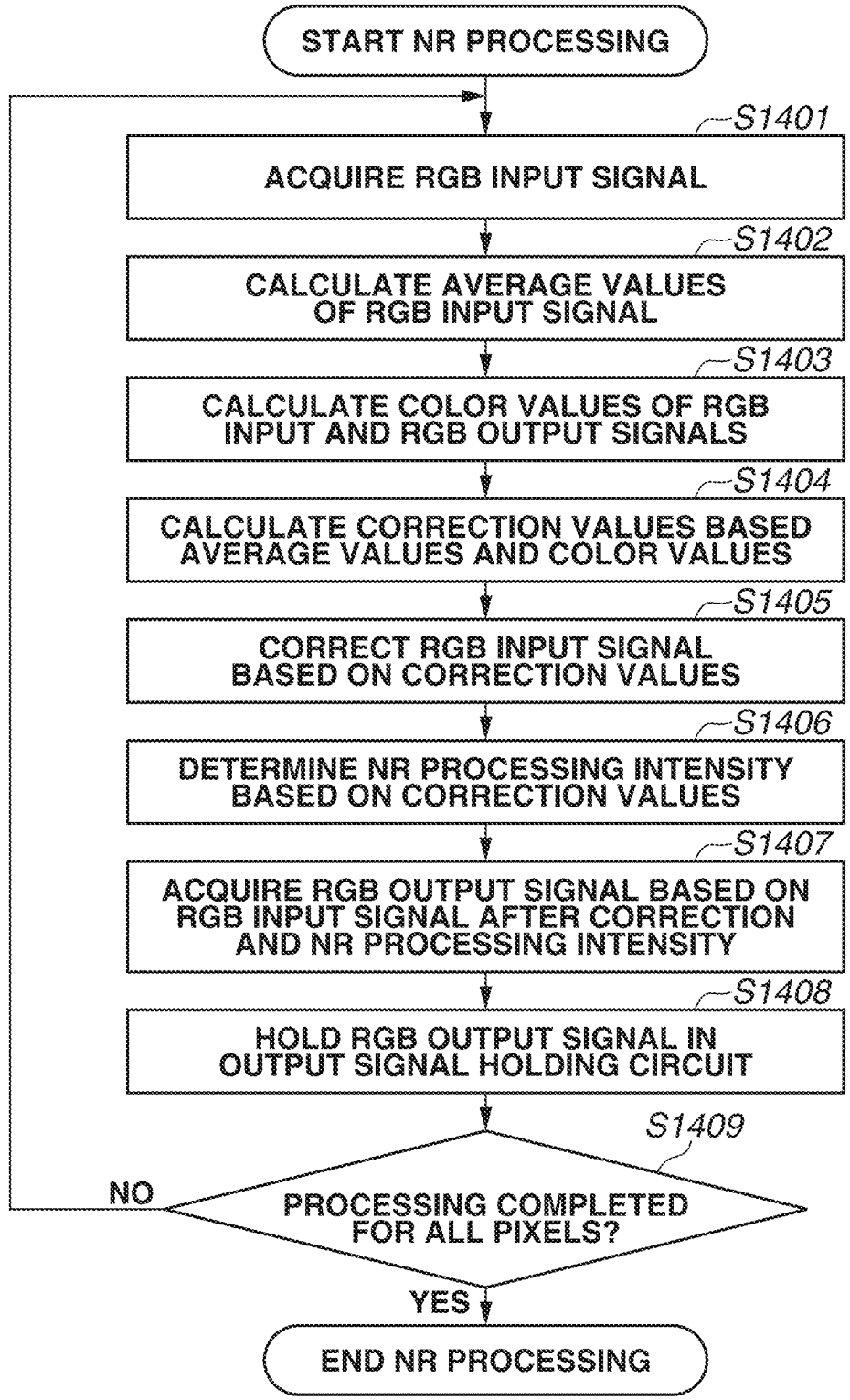
FIG. 14 is a flowchart illustrating NR processing according to the second embodiment.

Alternatively, the NR processing circuit 303 may be configured to combine the image signals before and after execution of the NR processing according to color value variation in the same frame. More specifically, as illustrated in FIG. 12, the NR processing circuit 303 includes an input signal acquisition circuit 1201, a noise amount calculation circuit 1202, an average value calculation circuit 1203, an NR intensity determination circuit 1204, an NR processing execution circuit 1205, and a color value calculation circuit 1206. The NR processing circuit 303 further includes a combination ratio calculation circuit 1207 and a combination processing circuit 1208. The combination ratio calculation circuit 1207 calculates the combination ratio based on the color values before and after execution of the NR processing calculated by the color value calculation circuit 1206, the noise levels, and the average values. More specifically, the combination ratio calculation circuit 1207 calculates the combination ratio based on formula (11) in a similar way to formula (8).

$$\text{Blend}(v, h) = \text{Blend}_{MAX} \times \left( \alpha \times \frac{\hat{\sigma}_R^2(v, h) - \sigma_{MIN}^2}{\sigma_{MAX}^2 - \sigma_{MIN}^2} \right) \times$$

$$\left( \beta \times \frac{\Delta a^* b^*_{MAX} - \Delta \hat{a}^* \hat{b}^*(v, h)}{\Delta a^* b^*_{MAX} - \Delta a^* b^*_{MIN}} \right) \times$$

$$\left( \gamma \times \frac{\Delta Ave(v, h) - \Delta Ave_{MIN}}{\Delta Ave_{MAX} - \Delta Ave_{MIN}} \right)$$

[Formula (11)]

Formula (11) calculates the combination ratio for the R component. Although descriptions of formulas are omitted, the combination ratio calculation circuit 1207 also calculates the combination ratio for the G and B components. Blend$_{MAX}$ in formula (11) is a parameter for defining the range between the upper- and lower-limit values of a combination ratio Blend(v, h). Other parameters are similar to those in formula (8). Although, in the present embodiment, the parameter Blend$_{MAX}$ is defined in a range from 0.0 to 1.0, the parameter is not limited thereto.

Then, based on the combination ratio calculated by the combination ratio calculation circuit 1207, the combination processing circuit 1208 combines the signal R$_{IN}$(v, h) before execution of the NR processing and the signal R'$_{OUT}$(v, h) after execution of the NR processing to calculate the final output signal R$_{OUT}$(v, h), based on formula (12).

[Formula (12)]

$$R_{OUT}(v,h)=(1.0-\text{Blend}(v,h))\times R_{IN}(v,h)+\text{Blend}(v,h)\times R'_{OUT}(v,h)$$

[Formula 12]

Formula (12) calculates the final output signal for the R component. Although descriptions of formulas are omitted, the combination ratio calculation circuit 1207 also calculates the combination ratio for the G and B components. The combination ratio in formula (11) is calculated by taking into consideration not only the average values and noise levels of the RGB components of the input signal but also variation between the saturation values before and after execution of the NR processing. Therefore, as the final output signal calculated by formula (12), a combined signal having both the effect of reducing a color fogging and the effect of reducing noise can be acquired.

Configuring the NR processing circuit 303, as illustrated in FIGS. 11 and 12 enables determining the NR processing intensity and performing the NR processing based on color value variation of the image signal in the same frame before and after execution of the NR processing.

A second embodiment will be described below.

An imaging system and an internal configuration of a monitoring camera 101 according to the second embodiment are substantially similar to the configuration according to the first embodiment, and thus illustrations and descriptions thereof will be omitted.

FIG. 11 is a block diagram illustrating an example of an internal configuration of an NR processing circuit 303 according to the second embodiment. The NR processing circuit 303 according to the second embodiment includes an input signal acquisition circuit 1301, an average value calculation circuit 1302, a color value calculation circuit 1303, an NR intensity determination circuit 1304, an NR processing execution circuit 1305, and an output signal holding circuit 1306. The NR processing circuit 303 further includes a correction value calculation circuit 1307 and a correction processing circuit 1308. The input signal acquisition circuit 1301 is similar to the input signal acquisition circuit 701 illustrated in FIG. 7. The average value calculation circuit 1302 is similar to the average value calculation circuit 703, the color value calculation circuit 1303 is similar to the color value calculation circuit 704, the NR processing execution circuit 1305 is similar to the NR processing execution circuit 706, and the output signal holding circuit 1306 is similar to the output signal holding circuit 707, and thus detailed descriptions thereof will be omitted.

According to the above-described first embodiment, the NR processing execution circuit 706 of the NR processing circuit 303 performs the NR processing on the RGB input signal, as in step S806 illustrated in FIG. 8. The NR processing circuit 303 according to the second embodiment corrects the RGB input signal based on the average values calculated by the average value calculation circuit 1302 and the color values calculated by the color value calculation circuit 1303, and performs the NR processing on the RGB input signal having undergone the correction.

The NR intensity determination circuit 705 according to the first embodiment determines the NR processing intensity based on the noise levels, the average values, and the color values of the RGB input signal, as in step S805 illustrated in FIG. 8. The NR intensity determination circuit 1304 according to the second embodiment determines the NR processing intensity according to correction values calculated based on the average values calculated by the average value calculation circuit 1302 and the color values calculated by the color value calculation circuit 1303. As described above with reference to the first embodiment, the color values calculated by the color value calculation circuit 1303 include the color values a*$_{IN(v, h)}$ and b*$_{IN(v, h)}$ of the RGB input signal, and the color values a*$_{OUT(v, h)}$ and b*$_{OUT(v, h)}$ of the RGB output signal having undergone the NR processing.

FIG. 12 is a flowchart illustrating the flow of processing performed by each block of the NR processing circuit 303 illustrated in FIG. 11 according to the second embodiment. Referring to FIG. 12 and above-described FIG. 8, step S1401 performs the same processing as step S801, step S1402 performs the same processing as step S803, step S1403 performs the same processing as step S804, step S1408 performs the same processing as step S807, and step S1409 performs the same processing as step S808, and descriptions thereof will be omitted. Processing in the flowchart illustrated in FIG. 12 different from the flowchart illustrated in FIG. 8 will be described below.

In step S1404, the correction value calculation circuit 1307 generates correction values based on the average values calculated by the average value calculation circuit 1302 and the color values calculated by the color value calculation circuit 1303. For example, the correction value calculation circuit 1307 calculates the color value variation $\Delta a^*b^*(v, h)$ based on the color values $a^*_{IN(v, h)}$ and $b^*_{IN(v, h)}$ of the RGB input signal from the color value calculation circuit 704 and the color values $a^*_{OUT(v, h)}$ and $b^*_{OUT(v, h)}$ of the RGB output signal, by using formula (3). The color value variation $\Delta a^*b^*(v, h)$ indicates variation between the colors before and after execution of the NR processing, as described above in the first embodiment. The correction value calculation circuit 1307 calculates the average value difference $\Delta Ave(v, h)$ by using the above-described formula (4).

Then, the correction value calculation circuit 1307 determines correction values based on the color value variation $\Delta a^*b^*(v, h)$ and the average value difference $\Delta Ave(v, h)$. More specifically, the correction value calculation circuit 1307 sets a larger correction value the smaller the average value difference and the larger the color value variation. In this case, the correction values are set so that the average value for each of the RGB components substantially becomes equal. In this case, a region where the average value difference is small and the color value variation is large is ordinarily assumed to be an achromatic region. In this region, a color deviation is highly likely to occur through the NR processing. Therefore, through the processing in step S1404, the correction value calculation circuit 1307 calculates correction values for the average value for each of the RGB components in such a manner that such a region comes closer to an achromatic color region.

In step S1405, the correction processing circuit 1308 performs correction processing according to the correction values calculated by the correction value calculation circuit 1307 on each of the RGB components $R_{IN}(v, h)$, $G_{IN}(v, h)$, and $B_{IN}(v, h)$ of the RGB input signal. Then, the RGB input signal having undergone the correction processing is transmitted to the NR processing execution circuit 1305.

In step S1406, the NR intensity determination circuit 1304 determines the NR processing intensity according to the correction values calculated by the correction value calculation circuit 1307. Although the processing by the NR intensity determination circuit 1304 is generally the same as the above-described processing according to the first embodiment, the noise levels according to the first embodiment are not used. Instead, the NR intensity determination circuit 1304 performs processing for determining the NR intensity coefficient according to the correction values. For example, when the correction values are large, it is assumed that random noise is amplified with a gain applied to each of the RGB components. Therefore, the NR intensity determination circuit 1304 sets the NR processing intensity to a larger value the larger the correction values calculated by the correction value calculation circuit 1307 are.

In step S1407, the NR processing execution circuit 1305 performs the NR processing according to the NR processing intensity determined in step S1406 on the RGB input signal having undergone the correction processing in step S1405.

As described above, according to the second embodiment, the RGB input signal is corrected by using correction values based on the average value for each of the RGB components obtained from the RGB input signal and variation between the colors before and after execution of the NR processing. Then, the NR processing intensity is determined according to the correction values. In the second embodiment, the NR processing is performed on the RGB input signal having undergone correction by the correction values according to the NR processing intensity determined based on the correction values. According to the second embodiment, it becomes possible to suitably reduce noise while reducing a color deviation occurring in an achromatic region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2018-024128, filed Feb. 14, 2018, and No. 2019-004360, filed Jan. 15, 2019, which are hereby incorporated by reference herein in their entirety.

What is claimed is:

1. An image processing apparatus comprising:
at least one processor; and
a memory including instructions that, when executed by the processor, cause the at least one processor to:

calculate color values from an image signal, wherein the color values include the color values of a signal before execution of the noise reduction processing for the image signal and the color values of the signal after execution of the noise reduction processing;

calculate average values of the image signal, wherein the average values include an average value for each of a plurality of color components included in the image signal;

perform noise reduction processing on the image signal, with an intensity according to evaluation values including the average values and the color values;

calculate a variation between the color values before and after execution of the noise reduction processing;

calculate an average value difference for each of the plurality of color components;

calculate an intensity coefficient indicating the intensity of the noise reduction processing based on the average value difference and the color value variation;

perform the clip processing on each of the average value difference and the color value variation based on a comparison with at least two setting values; and calculate the intensity coefficient based on the average value difference and the color value variation after execution of the clip processing.

2. The image processing apparatus according to claim 1, wherein the instructions, when executed by the processor, further cause the at least one processor to:

calculate noise levels of the image signal, and wherein the evaluation values include the noise levels.

3. The image processing apparatus according to claim 1, wherein the instructions, when executed by the processor, further cause the at least one processor to:

correct the image signal based on the average values and the color values, and wherein the noise reduction processing is performed on the corrected image signal.

4. The image processing apparatus according to claim 3, wherein the instructions, when executed by the processor, further cause the at least one processor to:

calculate the average value difference for each component; and increase the setting of the intensity of the noise reduction processing with the decreasing difference value.

5. The image processing apparatus according to claim 4, wherein the instructions, when executed by the processor, further cause the at least one processor to:

calculate variation between the color values of the signals before and after execution of the noise reduction processing; and increase the setting of the intensity of the noise reduction processing with the increasing variation.

6. An image processing apparatus comprising:

at least one processor; and a memory including instructions that, when executed by the processor, cause the at least one processor to:

calculate color values from an image signal, wherein the color values include the color values of a signal before execution of the noise reduction processing for the image signal and the color values of the signal after execution of the noise reduction processing;

calculate average values of the image signal, wherein the average values include an average value for each of a plurality of color components included in the image signal;

perform noise reduction processing on the image signal, with an intensity according to evaluation values including the average values and the color values;

calculate a variation between the color values before and after execution of the noise reduction processing;

calculate an average value difference for each of the plurality of color components;

calculate an intensity coefficient indicating the intensity of the noise reduction processing based on the average value difference and the color value variation;

wherein a setting of the intensity coefficient is increased with the increasing average value difference.

7. The image processing apparatus according to claim 6, wherein the setting of the intensity coefficient is increased with the decreasing color value variation.

8. The image processing apparatus according to claim 7, wherein the intensity coefficient is calculated according to a ratio of the average value difference to the color value variation.

9. An image processing apparatus comprising:

at least one processor; and a memory including instructions that, when executed by the processor, cause the at least one processor to:

calculate color values from an image signal, wherein the color values include the color values of a signal before execution of the noise reduction processing for the image signal and the color values of the signal after execution of the noise reduction processing;

calculate average values of the image signal, wherein the average values include an average value for each of a plurality of color components included in the image signal;

perform noise reduction processing on the image signal, with an intensity according to evaluation values including the average values and the color values;

calculate noise levels of the image signal;

calculate variation between the color values before and after execution of the noise reduction processing;

calculate an average value difference for each of the plurality of color components; and calculate an intensity coefficient to be used for the noise reduction processing based on the noise levels, the average value difference, and the color value variation;

wherein the intensity coefficient increases with the increasing noise level values.

10. An image processing apparatus comprising:

at least one processor; and a memory including instructions that, when executed by the processor, cause the at least one processor to:

calculate color values from an image signal, wherein the color values include the color values of a signal before execution of the noise reduction processing for the image signal and the color values of the signal after execution of the noise reduction processing;

calculate average values of the image signal, wherein the average values include an average value for each of a plurality of color components included in the image signal;

perform noise reduction processing on the image signal, with an intensity according to evaluation values including the average values and the color values;

calculate noise levels of the image signal;

calculate variation between the color values before and after execution of the noise reduction processing;

calculate an average value difference for each of the plurality of color components; and calculate an intensity coefficient to be used for the noise reduction processing based on the noise levels, the average value difference, and the color value variation;

wherein the intensity coefficient is calculated according to the noise levels and a ratio of the average value difference to the color value variation.

11. An image processing method performed by an image processing apparatus, the method comprising:
   calculating color values from an image signal, wherein the color values include the color values of a signal before execution of the noise reduction processing for the image signal and the color values of the signal after execution of the noise reduction processing;
   calculating average values of the image signal, wherein the average values include an average value for each of a plurality of color components included in the image signal;
   performing noise reduction processing on the image signal, with an intensity according to evaluation values including the average values and the color values;
   calculating a variation between the color values before and after execution of the noise reduction processing;
   calculating an average value difference for each of the plurality of color components;
   calculating an intensity coefficient indicating the intensity of the noise reduction processing based on the average value difference and the color value variation;
   performing the clip processing on each of the average value difference and the color value variation based on a comparison with at least two setting values; and
   calculating the intensity coefficient based on the average value difference and the color value variation after execution of the clip processing.

12. A non-transitory computer-readable storage medium having stored thereon a program that, when executed by a computer, causes the computer to:
   calculate color values from an image signal, wherein the color values include the color values of a signal before execution of the noise reduction processing for the image signal and the color values of the signal after execution of the noise reduction processing;
   calculate average values of the image signal, wherein the average values include an average value for each of a plurality of color components included in the image signal;
   perform noise reduction processing on the image signal, with an intensity according to evaluation values including the average values and the color values;
   calculate a variation between the color values before and after execution of the noise reduction processing;
   calculate an average value difference for each of the plurality of color components;
   calculate an intensity coefficient indicating the intensity of the noise reduction processing based on the average value difference and the color value variation;
   perform the clip processing on each of the average value difference and the color value variation based on a comparison with at least two setting values; and
   calculate the intensity coefficient based on the average value difference and the color value variation after execution of the clip processing.

* * * * *